ns of Letters Patent No. 399,045, dated March 5, 1889.

UNITED STATES PATENT OFFICE.

BEN W. HUNTER, OF WASHINGTON, DISTRICT OF COLUMBIA, ASSIGNOR OF FOUR-FIFTHS TO CLEMENT W. HOWARD, OF SAME PLACE.

PAVEMENT.

SPECIFICATION forming part of Letters Patent No. 399,045, dated March 5, 1889.

Application filed March 23, 1888. Serial No. 268,281. (No specimens.)

*To all whom it may concern:*

Be it known that I, BEN W. HUNTER, of Washington, in the District of Columbia, have invented a new and useful Improvement in Pavements; and I do hereby declare that the following is a full, clear, and exact description of the same.

My invention is an improved composition of matter designed principally for the pavement of streets; but it is applicable for use as sidewalks and as a covering for the floors of buildings.

My improved composition is prepared of materials in proportion and in the manner hereinafter specified. I take of paraffine-oil, or the residuum thereof, ten pounds; of common rosin, ten pounds; of coal-tar or pan-pitch, the residuum of distilled coal-tar, eighty pounds, and of asphalt forty pounds, and mix these thoroughly together. The common rosin effects the desired union between the oil and the tar, and the whole forms an exceedingly-sticky substance. This substance or some equivalent binding mixture or substance is required to combine properly the other ingredients of my composition. Of this composition I take to form a pavement twelve per cent. of sand or sand grits, eighty per cent. of comminuted fibrous rock or coarse asbestus eight per cent., and these ingredients I mix thoroughly to form a composition suitable for pavement.

The fibrous rock mentioned above is formed of magnesia, silica, and iron and has a strong fiber. It is found in some parts of Virginia, and it may be used in the place of asbestus. The fibrous rock in connection with the adhesive or sticky substance forms a strong bond for the sand or grit and constitutes a very hard and tough pavement or floor.

As above stated, I may use any fixed oil in the manufacture of my paving composition; but I prefer to use paraffine-oil or the residuum thereof, and while the paraffine-oil is not a fixed oil I have found by experiment that an affinity is secured between paraffine, coal-tar, and asphalt by a mixture with rosin, and the paraffine by this mixture becomes a fixed oil.

I am aware that a composition has been made for roofing purposes composed of asphalt, coal-tar, and rosin, and I do not broadly claim the use of these ingredients. I have found by experiment that the elements stated are not fitted for use as a permanent composition, for the reason that a pavement formed of such a composition becomes very dry and hard, and under the action of vehicles will wear into fine particles, and that it is necessary to unite with these elements a fixed or non-drying oil. The cheapest of these oils, and the one I prefer to use, is paraffine-oil or the residuum thereof. Ordinarily this oil has no affinity for other ingredients; but I have found that by first mixing the oil with the rosin a resulting product is obtained which has a great affinity for the coal-tar and asphalt, and the result is a pavement composition permanently oily and non-drying, and therefore not liable to break.

I claim—

A paving composition consisting of sand and grits, fibrous rock, a fixed oil, rosin, coal-tar, and asphalt, substantially in the proportions specified.

In testimony whereof I have signed my name to this specification in the presence of two subscribing witnesses.

BEN W. HUNTER.

Witnesses:
THOS. H. SHERMAN,
JOHN J. CHEW.